US009967168B2

(12) United States Patent
Wang

(10) Patent No.: US 9,967,168 B2
(45) Date of Patent: May 8, 2018

(54) REMOTE REAL-TIME MONITORING SYSTEM BASED ON CLOUD COMPUTING

(75) Inventor: Shen Wang, Changsha (CN)

(73) Assignee: HUNAN SCIENTOP AUTOMATIC EQUIPMENT CO., LTD, Changsha, Hunan (CN)

( * ) Notice: Subject to any disclaimer, the term of this patent is extended or adjusted under 35 U.S.C. 154(b) by 1021 days.

(21) Appl. No.: 14/360,614

(22) PCT Filed: Nov. 23, 2011

(86) PCT No.: PCT/CN2011/082709
§ 371 (c)(1),
(2), (4) Date: Sep. 17, 2014

(87) PCT Pub. No.: WO2013/075297
PCT Pub. Date: May 30, 2013

(65) Prior Publication Data
US 2015/0032886 A1     Jan. 29, 2015

(51) Int. Cl.
| | |
|---|---|
| *G06F 15/173* | (2006.01) |
| *H04L 12/26* | (2006.01) |
| *G06F 11/30* | (2006.01) |
| *G06F 11/07* | (2006.01) |
| *H04L 29/08* | (2006.01) |
| *G06F 9/50* | (2006.01) |

(52) U.S. Cl.
CPC ............ *H04L 43/10* (2013.01); *G06F 9/5072* (2013.01); *G06F 11/0709* (2013.01); *G06F 11/079* (2013.01); *G06F 11/0766* (2013.01); *G06F 11/3006* (2013.01); *G06F 11/3065* (2013.01); *H04L 67/02* (2013.01)

(58) Field of Classification Search
CPC ....... H04L 43/10; H04L 67/02; H04L 65/403; H04L 65/605; G06F 9/5072; G06F 11/0709; G06F 11/079; G06F 11/3006; G06F 11/3065
USPC .......................................................... 709/224
See application file for complete search history.

(56) References Cited

FOREIGN PATENT DOCUMENTS

CN     102130947     *    1/2011

* cited by examiner

*Primary Examiner* — Joseph E Avellino
*Assistant Examiner* — Patrick Ngankam

(57) ABSTRACT

A remote real-time monitoring system based on cloud computing is disclosed, comprising: a monitored terminal which is a terminal for collecting data and processing control on site, a management terminal which is a user terminal for performing remote monitoring and managing on the monitored terminal, and a cloud monitoring platform. The monitored terminal and the management terminal are connected to the cloud monitoring platform through a network comprising GPRS, 3G broadcast TV network, telecommunication network, power carrier network and satellite via the Internet. A monitoring service system operated on the cloud monitoring platform stores, analyzes and computes data sent by the monitored terminal. A monitoring service system, a fault diagnosis system and a report analysis system and etc. are also mounted to monitor states of the monitored terminal and pre-warn a fault in real time.

6 Claims, 4 Drawing Sheets

REMOTE REAL-TIME MONITORING SYSTEM BASED ON CLOUD COMPUTING

CROSS REFERENCE OF RELATED APPLICATION

This is a U.S. National Stage under 35 U.S.C 371 of the International Application PCT/CN2011/082709, filed Nov. 23, 2011.

BACKGROUND OF THE PRESENT INVENTION

Field of Invention

The present invention relates to a remote real-time monitoring system, and more particularly to a remote real-time monitoring system based on cloud computing which comprises a cloud monitoring platform for data collecting, fault diagnosing and pre-warning, built by utilizing the cloud storage technique, the virtual machine technique, the data management technique and the distributed computing technique.

Description of Related Arts

In recent years, with the development of cloud technology, various types of cloud platforms have been built in civil industries, including the public cloud, the enterprise cloud and the private cloud. The rise of cloud technology will lead a new type information technological revolution, which solves the problems that the upgrade of the hardware can not keep up with the massive growth of data, and that the cost is increasing without limit.

Nowadays, during the application of the monitoring system, especially for monitoring industrial equipments, the monitored objects have to be controlled and managed effectively, so as to meet the requirements of complicated and decentralized sites for monitoring and increasingly heated competition market and the requirements for environmental protection and energy saving. However, building a monitoring system is so complicated that general small businesses are not capable of affording. Only large scaled agencies or large corporations have sufficient human, physical and financial resources to support building the system. Generally, the following problems exist in building the conventional monitoring system.

1. Building the software system is complicated and takes a long term, which requires a specialized software team.

In the traditional mode, the enterprise develops the centralized control software according to situation of itself. Developing software by the enterprise itself needs not only a long developing cycle (1-2 years), but also a powerful software team.

2. Building the software and hardware of the system is expensive, and each enterprise has to invest respectively and repeatedly.

In order to build an enterprise-level monitor server, each enterprise must spend a huge amount of money for the investment. The investment of the software includes the purchase and installation of software tools such as operating system, database software, firewall and antivirus software. The investment of the hardware includes the facilities of the computer room, the network facilities and the host which are essential for operating the system, wherein the facilities of the computer room comprise a professional computer room, an ups power source and a rack; the network facilities comprise a switch, optical fibers and an IP; and the host comprises a database server and an application server.

3. The investment for post-service team is high.

The enterprise-level server requires to be maintained by the enterprise. Thus, each enterprise must select network managers and form a special management team according to the situation thereof, so as to process daily upgrading, security managing of data, backuping and restoring of functions on the server.

The conventional enterprise monitoring mode of building and then using has disadvantages as follows.

1. Big Waste of Resource

The enterprises repeatedly construct the computer room, the server, the storage device, the network and the technical personnel.

2. Great Construction Difficulty and High Cost

A small-sized or medium-sized monitoring system costs millions of dollars from construction to operation.

3. Long Construction Period

The construction of the system takes several months, even several years, from demand, design and development, purchase, installation to application and operation.

4. Difficult System Management

Due to the lack of the technical personnel or the inadequately professional management by the technical personnel, the constructed system usually has problems in the operating process, and thus is not capable of achieving the expected effects thereof.

5. Data Island

The disconnected systems and the fragmented data are unfavorable to the accumulation of the monitoring knowledge and the jointed-networks analysis of the data, and also unfavorable to the development and progress of the monitoring technology.

Due to the disadvantages mentioned above, the application of the monitoring system is stagnant, which greatly hinders promoting and popularizing the informatization of the monitoring system, so that it is really hard to improve the monitoring technology.

SUMMARY OF THE PRESENT INVENTION

Accordingly, in order to accomplish the above objects, the present invention provides a remote real-time monitoring system based on cloud computing, wherein an elastic cloud technique capable of regulating configuration of a cloud host is adopted for integrating services of computation storage and IAAS or SAAS of the network resource; each monitored terminal and each management terminal are connected to a cloud monitoring platform through a network comprising GPRS, 3G, Ethernet, broadcast TV network, telecommunication network, power carrier network and satellite, in an online and real-time manner, via the Internet. The cloud monitoring platform distributes different monitoring units, so as to achieve monitoring simply and conveniently.

Technical solution adopted by the present invention is as follows.

A remote real-time monitoring system based on cloud computing, comprises: a plurality of monitored terminals, a plurality of management terminals and a cloud monitoring platform, wherein the monitored terminals and the management terminals are connected to the cloud monitoring platform through a network via Internet, wherein the network comprises GPRS, 3G, Ethernet, broadcast TV network, telecommunication network, power line carrier network and satellite; and wherein the cloud monitoring platform manages the plurality of the monitored terminals and the plurality of the management terminals simultaneously, and remotely monitor and manage multi-users, multi-projects and multi-facilities via a cloud.

According to a preferred embodiment of the present invention, the monitored terminal collects or controls data of a field facility; the monitored terminal sends collected data to the cloud monitoring platform through the network via the Internet, and receives control data from the cloud monitoring platform, wherein the monitored terminal comprises at least one terminal selected from a group consisting of a remote positioning controller, PLC, a single chip, a computer and an instrument, wherein the monitored terminal with a controlling function is capable of receiving information and command from the cloud monitoring platform.

According to a preferred embodiment of the present invention, the management terminal is for remotely monitoring the monitored terminal; the management terminal is connected with the cloud monitoring platform through the network via the Internet; the cloud monitoring platform transmits data of operation states and analysis reports of the monitored terminal to the management terminal, and meanwhile, the management terminal sends the control data via the cloud monitoring platform in real time to control the monitored terminal, wherein the management terminal comprises at least one terminal selected from a group consisting of a personal computer, a handhold terminal and a mobile terminal.

According to a preferred embodiment of the present invention, the cloud monitoring platform remotely and securely store and access the data of the monitored terminals and the management terminals, provides real-time analysis and diagnosis, gives an alarm on abnormal condition, and informs the management terminals and relevant managers timely in various communications manners. Utilizing a cloud related technology, the cloud monitoring platform distributes different monitoring units for providing monitoring service according to categories or properties of the monitored terminal, wherein the monitoring units having identical industry properties are classified into an industry monitoring group unit; each industry knowledge unit in corresponding industry provides the cloud monitoring platform with knowledge; a cloud expert base comprises all of the industry knowledge units, wherein the cloud expert base provides all of the monitored terminals and the management terminals with a cloud monitoring.

According to a preferred embodiment of the present invention, the monitoring unit is a virtual node generated by the cloud monitoring platform through a cloud virtual technology according to requirements of managing and monitoring, wherein each monitoring unit controls and manages at least one monitored terminal. The management terminal is capable of checking at least one monitoring unit and at least one group unit. Each monitoring unit is capable of storing and processing the data to monitor the data, which comprise, but are not limited to capacities of data transmission, data storage, fault diagnosis, data publishing and command dispatching. Each group unit is capable of processing public information of the monitoring units in a group of the industries or one industry, which comprises, but is not limited to capacities of statistic analysis of the data, geographic information, secure authentication and dispatch and management of the data. Each knowledge unit has an intelligent decision-making capacity as a cloud platform expert. The knowledge units are classified into different types according to categories of the monitored terminals, such as air conditioner equipment, construction machinery equipment and networking industry. A plurality of the knowledge units forms an equipment monitoring expert base.

Preferably, in the data storage process, data collected by the monitored terminals and operational intermediate results are stored rapidly and distributedly on a secure storage medium via a cloud storage technology comprising HDFS and GFS. Due to a high requirement for a real time performance of controlling, and a large amount of the data, the storage adopts a multi-pole and multi-level pattern, so as to improve storing and processing speeds. For data having the high real-time performance, a high-speed and small-capacity storage is adopted, such as the control command. For the historical data processed in real time are stored in a large-capacity storage medium by a way of physical separation.

Preferably, when data transmission service of the cloud obtains and stores the data, a security processing module is invoked to verify security of the data through dispatch controlling of the data. Then the data requiring storage are stored in real time through the data storage service. Through dispatching, a diagnosis and expert engine is invoked to analyze the data. Then analysis results are outputted to the management terminal through a command control service and a command publishing service, or a decrypted command is sent to a remote monitored terminal for controlling and processing.

Preferably, the data diagnosis module, the command dispatching module and the expert countermeasure module are all belongs to data processing and computing services. The monitoring units on the cloud monitoring platform compute respective businesses according to requests of each monitored terminal and each management terminal. Utilizing patterns comprising Map-Reduce, nodes having same businesses are simplified and merged for computing, and finally computed results are outputted by respective outputting modules. Each computing node supports a plurality of parallel computing, and different outputting modules are capable of achieving configurable software customization service by individualized remote customization.

In order to better implement the technical solution mentioned above, the monitoring system requires a unified management by a professional team or a monitoring system operator, which comprises, but is not limited to planning and designing the monitoring system, managing and maintaining an access of the monitored terminals and the management terminals, and planning, building and maintaining the cloud monitoring platform.

Beneficial effects of the present invention are as follows.

1. The remote real-time monitoring system based on cloud computing of the present invention is low in cost.

Each user of the present invention does not need to purchase software or hardware devices including the server, the platform for the system and etc. In addition, the present invention does not need to be equipped with professional technicians. Monitoring can be achieved just by purchasing service at a low cost according to the requirements of users, which does not need the construction and maintenance costs.

2. The remote real-time monitoring system based on cloud computing of the present invention has high reliability.

The cloud monitoring platform of the present invention adopts professional software such as genuine original system software and antivirus software, and is managed and maintained daily by professional technicians. The cloud monitoring platform is equipped with plenty of various types of computing hardware devices and network devices, professional anti-virus and anti-attack security software/hardware, and specialized superior computer room, so as to maximize a sharing of software/hardware resources and human resources.

3. The remote real-time monitoring system based on cloud computing of the present invention has a high performance in utilization.

Through the cloud technique, collecting and sharing data on line can be achieved, and parallel computation on large-scale data and customized service thereof can be processed, in such a manner that the efficiency of the present invention is much greater than a self-built server by the enterprise.

4. The remote real-time monitoring system based on cloud computing of the present invention is easy and convenient in utilization.

The monitored terminal can be controlled and managed complicatedly by processing a simple interface customization according to a monitoring protocol. A remote management can be achieved just by connecting the management terminal to the cloud monitoring platform, so as to facilitate the rapid promotion and popularization thereof.

5. The remote real-time monitoring system based on cloud computing of the present invention has a simple building model.

The remote real-time monitoring system of the present invention changes the application mode of the conventional monitoring device. The enterprises which demand monitoring can just provide operators of the monitoring system with monitoring requirements thereof, and do not need to build the system separately.

These and other objectives, features, and advantages of the present invention will become apparent from the following detailed description, the accompanying drawings, and the appended claims.

DETAILED DESCRIPTION OF THE PREFERRED EMBODIMENT

Figure 1:
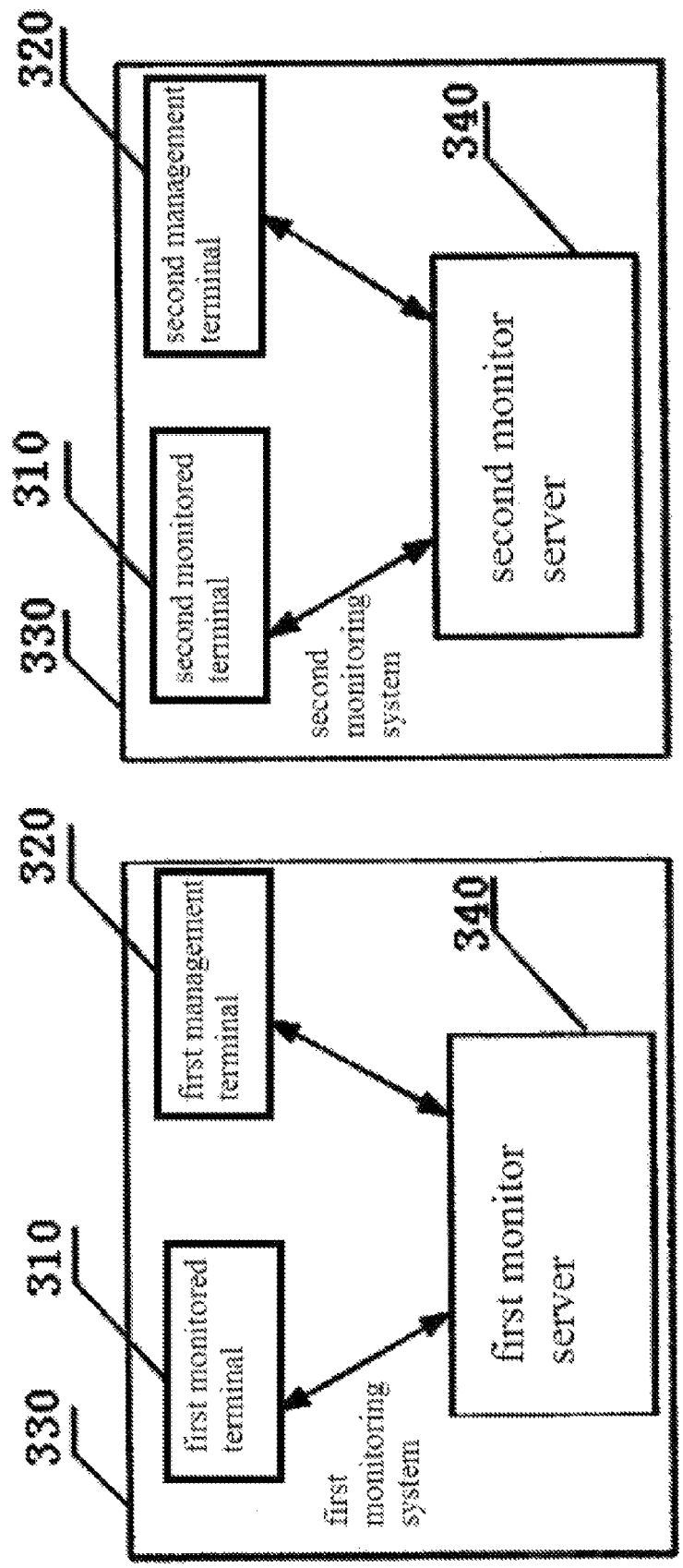
FIG. 1 is a structural sketch view of a conventional monitoring system.

FIG. 1 is a structural sketch view of a conventional monitoring system. In FIG. 1, each user or enterprise builds a monitoring system 330 of itself separately according to requirements thereof, wherein each monitoring system 330 comprises a monitored terminal 310, a management terminal 320 and a monitor server 340. The monitoring system 330 runs in a closed network environment, and supports a specific monitored terminal 310 and a specific management terminal 320.

Figure 2:
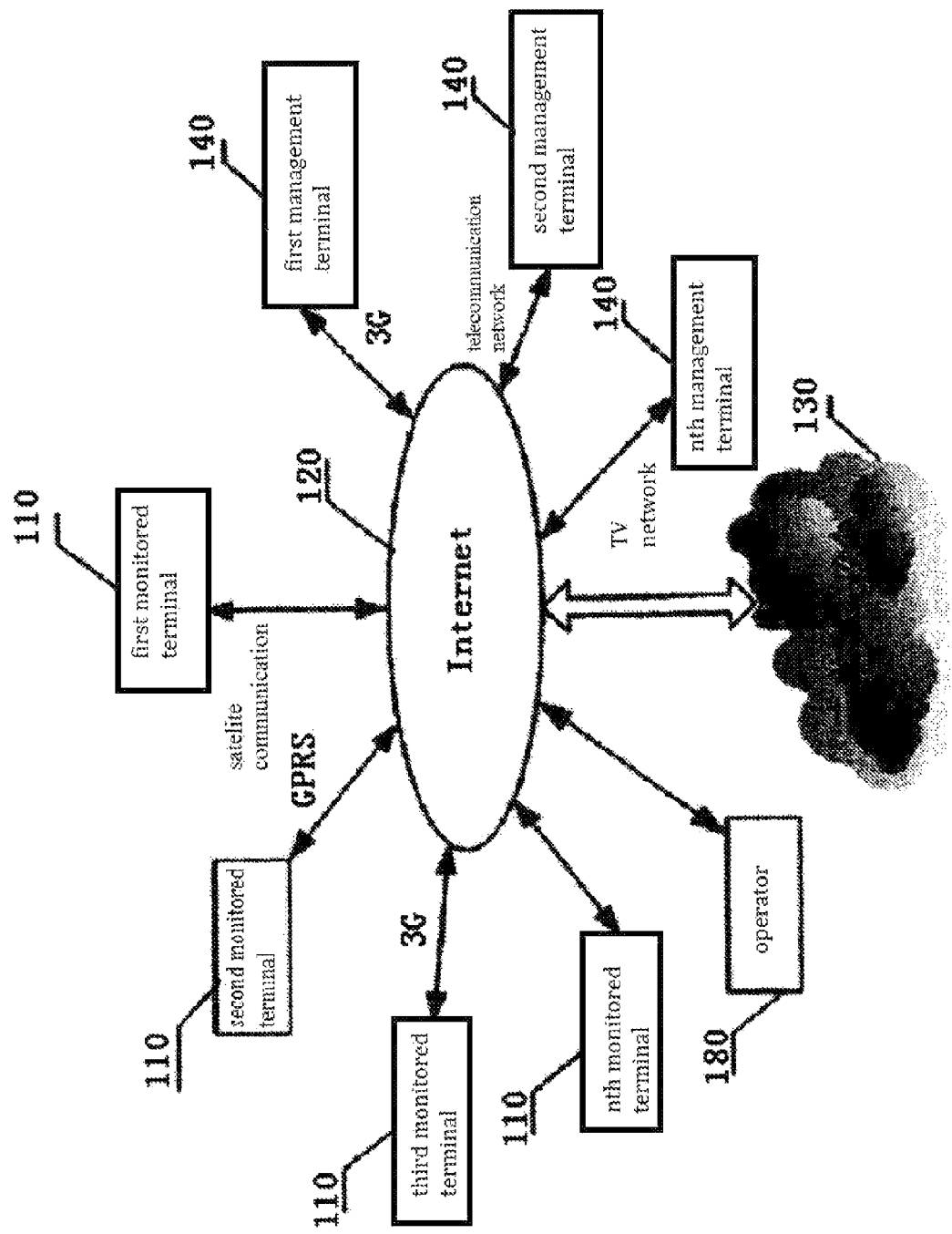
FIG. 2 is a structural sketch view of a remote real-time monitoring system based on cloud computing according to a preferred embodiment of the present invention.

FIG. 2 is a structural sketch view of a remote real-time monitoring system based on cloud computing according to a preferred embodiment of the present invention. In FIG. 2, network 120 is a communication carrier of a monitored terminal 110, a management terminal 140 and a cloud monitoring platform 130. The network 120 comprises but is not limited to GPRS, 3G, broadcast TV network and satellite network. The monitored terminal 110, the management terminal 140 and the cloud monitoring platform 130 are communicated with each other via the Internet, so as to ensure proper and secure transmission of the data. The monitored terminal 110 and the management terminal 140 are connected to the cloud monitoring platform 130 with a specified IP address via the network 120. Under a condition that the network address is available in the future, which comprises but is not limited to IPV6 protocol, each monitored terminal and each management terminal is assigned with an address, so as to achieve a mutual communication mode between the platform and the terminal. The operator 180 of the monitoring system, which is the managing and operating subject of the monitoring system, is focused on the design, construction, maintenance and upgrade of the monitoring system and provides professional technicians and device monitoring professors for professional services.

Referring to FIG. 2 of the drawings, the monitored terminal 110 and the management terminal 140 are connected to the cloud monitoring platform 130 via the network 120. The monitored terminal 110 is communicated with the cloud monitoring platform via the monitoring protocol. The monitored terminal 110 sends operating condition information of the device to the cloud monitoring platform 130, and receives controlling command information from the cloud monitoring platform 130. The management terminal 140 is communicated with the cloud monitoring platform 130 via the monitoring protocol, sends a command for controlling the monitored terminal 110 to the cloud monitoring platform 130, and receives the operating condition information of the monitored terminal 110, alarming information, decision-making analytical information and etc. provided by the cloud monitoring platform 130.

Figure 3:
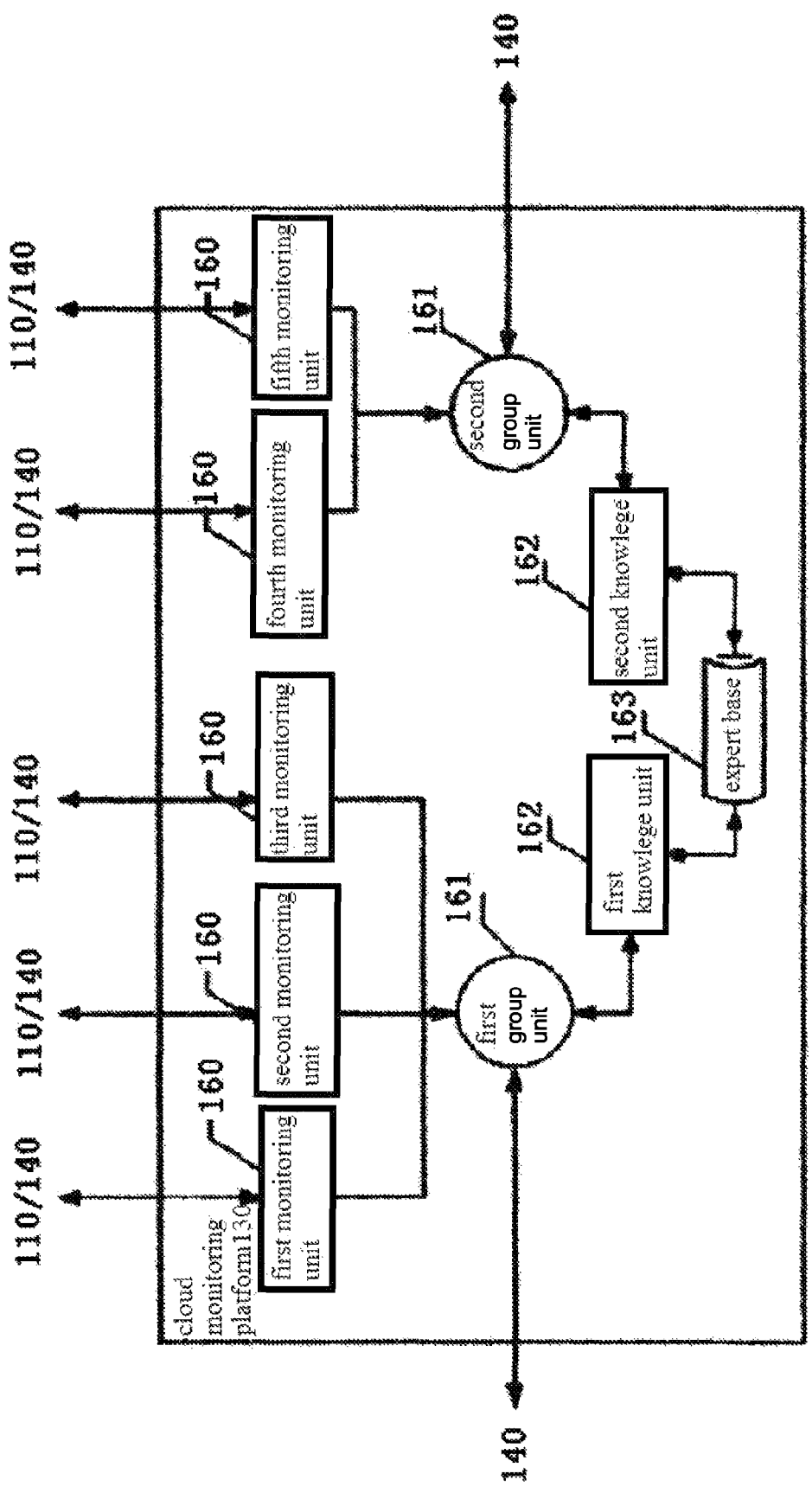
FIG. 3 is an internal structure schematic view of a cloud platform of the remote real-time monitoring system based on cloud computing according to the preferred embodiment of the present invention.

Referring to FIG. 3 of the drawings, the cloud monitoring platform 130 comprises N units, wherein each unit is assigned with computing, storing and network resources which are correspondent to a carrying capacity of each unit by a cloud distribution technology. A monitoring unit 160, a group unit 161, a knowledge unit 162 and an expert base 163 are provided inside the cloud monitoring platform 130. The monitoring unit 160 collects and stores data and sends a command to the monitored terminal 110, receives a management request from the management terminal 140, and outputs an analytical monitoring result to the management terminal 140. The group unit 161 takes charge of secure authentication, data encryption and decryption of the monitored terminals 110 and the management terminals 140. The knowledge unit 162 provides knowledge management of the monitored device, and decision-making capacity. The expert base 162 continuously collects property parameters and disorder conditions of the monitored terminals via an automatic learning mechanism by an intelligence analytical mining technology, so as to form an expert diagnosis and decision-making system.

Figure 4:
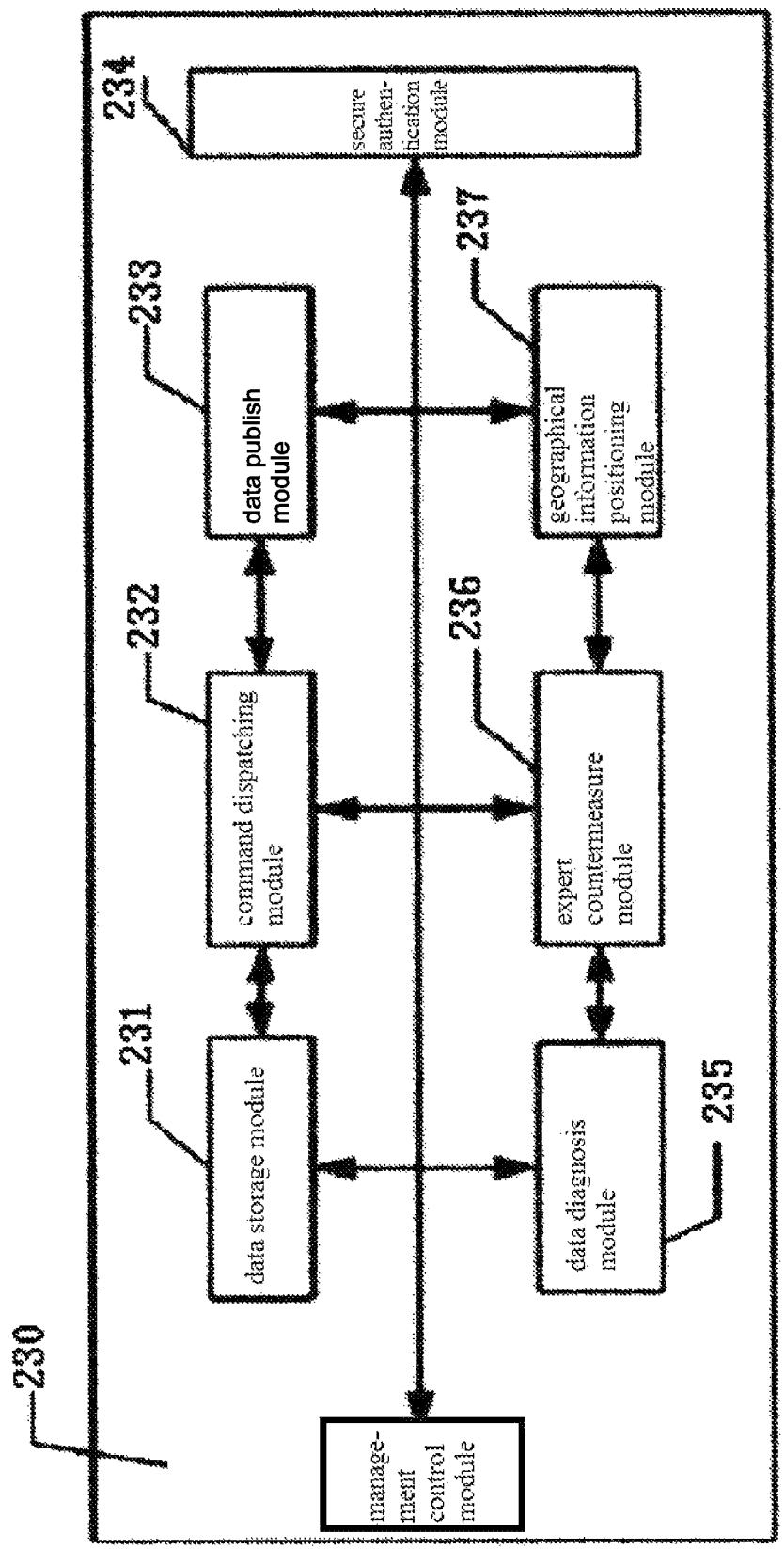
FIG. 4 is an internal structure schematic view of modules in the cloud platform of the remote real-time monitoring system based on cloud computing according to the preferred embodiment of the present invention.

Referring to FIG. 4 of the drawings, an internal structure of modules in the cloud monitoring platform 130 comprises but is not limited to: a management control module 230, a data storage module 231, a command dispatching module 232, a data publish module 233, a security authentication module 234, a data diagnosis module 235, an expert countermeasure module 236 and a geographical information positioning module 237, wherein data flow direction among the modules is as follows:

transmitting data to the monitoring unit 160 by the monitored terminal 110, ordering corresponding modules to process the data by the management control module 230, wherein firstly the secure authentication module 234 is invoked to authenticate, encrypt and decrypt the monitored terminal; then the data storage module 231 is invoked to store; the data diagnosis module 235 and the expert countermeasure module 236 are invoked to diagnose and analyze; and finally the data storage module 233 is invoked to publish information, wherein when the information is a command to be published, the command dispatching module 232 is invoked for publishing a command or pre-warning; and wherein when the information is map information, the geographical information positioning module 247 is invoked, and meanwhile the monitored terminal 110 and the management terminal 140 are informed of published result; when the management terminal 140 sends a service request to the cloud monitoring platform 130, after the monitoring units 160 or the group unit 161 in the cloud monitoring platform 130 receives a command, the management control module 230 invokes corresponding modules to process, wherein firstly the security authentication module 234 is invoked to authenticate, encrypt and decrypt the management terminal 140; the data storage module 231 is invoked to process storage; the data publish module 233 is invoked to publish the command, and the command dispatching module 232 is ordered to analyze and verify the command; thereafter the data publish module 233 distributes the command to the monitored terminals 110.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A remote real-time monitoring system based on cloud computing, comprising: a plurality of monitored terminals, a plurality of management terminals and a cloud monitoring platform, wherein the monitored terminals and the management terminals are connected to the cloud monitoring platform through a network via Internet;

wherein the cloud monitoring platform manages the plurality of the monitored terminals and the plurality of the management terminals simultaneously, and remotely monitors and manages multi-users, multi-projects and multi-facilities through a cloud; and wherein the network comprises GPRS, 3G Ethernet, broadcast TV network, telecommunication network and power line carrier network;

wherein the cloud monitoring platform is built by distributing corresponding computing, storing and networking resources according to bearing capacity of a unit utilizing a cloud distribution technology, wherein the cloud monitoring platform comprises N monitoring units, N group units, N knowledge units and an expert base, and distributes different monitoring units for providing monitoring service according to categories or properties, the monitored terminals take charge of collecting and storing data, and sending a command, receives manage requests from the management terminals, outputs monitoring and analyzing results;

wherein monitoring units in a same industry property are collected to a group unit for industry monitoring, wherein the group unit takes charge of secure authentication, data encryption and decryption, protocol analysis and interface customization of the monitored terminals and the management terminals, wherein the knowledge unit in corresponding industry provides knowledge support, and knowledge units in all industries constitute a cloud expert base, wherein the cloud expert base provides cloud monitoring on all of the monitored terminal and the management terminal.

2. A remote real-time monitoring system based on cloud computing, comprising: a plurality of monitored terminals, a plurality of management terminals and a cloud monitoring platform, wherein the monitored terminals and the management terminals are connected to the cloud monitoring platform through a network via Internet;

wherein the cloud monitoring platform manages the plurality of the monitored terminals and the plurality of the management terminals simultaneously, and remotely monitors and manages multi-users, multi-projects and multi-facilities through a cloud; and wherein the network comprises GPRS, 3G Ethernet, broadcast TV network, telecommunication network and power line carrier network;

wherein internal structure of units in the cloud monitoring platform comprises: a management control module, a secure authentication module, a data storage module, a data diagnosis module, a command dispatching module, an expert countermeasure module, a data publish module and a geographical information positioning module, wherein flow direction among the units comprises following steps:

transmitting data to the monitoring unit via the monitored terminal, processing by corresponding modules under an order of the management control module, wherein firstly the secure authentication module is invoked to process authentication and decryption on the monitored terminal under command, then the data storage module is invoked to store, the data diagnosis module and the expert countermeasure module are invoked to process diagnosis and analysis, and finally the data storage module is invoked to publish information;

wherein when the information is a command for publishing, the command dispatching module is invoked for publishing a command or pre-warning;

wherein when the information is cartographic information, invoke the geographical information positioning module, and meanwhile inform the monitored terminal and the management terminal published result; when the management terminal sends a service request to the cloud monitoring platform, the management control module invokes corresponding modules to process after the monitoring units or the group units in the cloud monitoring platform receive a command, wherein firstly the secure authentication module is invoked to process authentication, encryption and decryption on the management terminal, the data storage module is invoked to process storage, the data publish module is invoked to publish the command, in such a manner that the command dispatching module processes analyzing and verifying the command, and then the command is published to the monitored terminal via the data publish—module.

3. The remote real-time monitoring system based on cloud computing, as recited in claim 1, wherein operators of the monitoring system is a management and operation subject of the monitoring system, and is responsible for design, construction, maintenance and upgrades of the monitoring system and provides professional technicians and experts in equipment monitoring industry for professional services.

4. The remote real-time monitoring system based on cloud computing, as recited in claim 1, wherein the monitored terminal collects or controls data of a field facility; and the monitored terminal sends the collected data to the cloud monitoring platform through the network via the Internet, and receives or executes control data from the cloud monitoring platform, wherein the monitored terminal comprises at least one terminal selected from a group consisting of a remote positioning controller, PLC, a single chip, a computer and an instrument.

5. The remote real-time monitoring system based on cloud computing, as recited in claim 1, wherein the management terminal is for remotely setting and monitoring the monitored terminal; the management terminal is connected with the cloud monitoring platform through the network via the Internet; the cloud monitoring platform transmits operating condition and analysis data of the monitored terminal to the management terminal, and meanwhile the management terminal sends control data in real time via the cloud monitoring platform to control the monitored terminal, wherein the management terminal comprises at least one terminal selected from a group consisting of a personal computer, a handhold terminal and a mobile terminal.

6. The remote real-time monitoring system based on cloud computing, as recited in claim 1, wherein the cloud monitoring platform is provided in an cloud environment, so as to securely store and access the data of the monitored terminals and the management terminals, provide real-time analysis and diagnosis, gives an alarm on abnormal condition, and informs the management terminals and relevant managers timely in a communications form comprising e-mail and short message.

* * * * *